United States Patent [19]

Schulz

[11] 4,087,585
[45] May 2, 1978

[54] SELF-ADHERING SILICONE COMPOSITIONS AND PREPARATIONS THEREOF

[75] Inventor: Jay R. Schulz, Bangor Township, Bay County, Mich.

[73] Assignee: Dow Corning Corporation, Midland, Mich.

[21] Appl. No.: 799,877

[22] Filed: May 23, 1977

[51] Int. Cl.$^2$ .................. C08G 77/04; B32B 17/06
[52] U.S. Cl. .................. 428/429; 252/1; 260/37 SB; 260/46.5 UA; 260/46.5 G; 428/447
[58] Field of Search ............ 260/37 SB, 46.5 UA; 428/429, 447; 252/1

[56] References Cited

U.S. PATENT DOCUMENTS 4,033,924  7/1977  Mine et al. ............ 260/37 SB

*Primary Examiner*—Lewis T. Jacobs
*Attorney, Agent, or Firm*—Roger H. Borrousch

[57] ABSTRACT

Mixing vinyl-containing polyorganosiloxane, a silicon-bonded hydrogen containing organosilicon compound, a platinum catalyst, a polysiloxane having at least one silicon-bonded vinyl radical and at least one silicon-bonded hydroxyl radical and an epoxy-containing, alkoxy silane provides a composition which exhibits improved adhesion to many substrates without the aid of a primer when heat cured in contact with the substrate. An example of the polysiloxane is a hydroxyl end-blocked polymethylvinylsiloxane and an example of the epoxy silane is

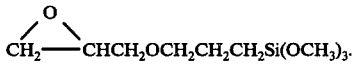

The compositions not only have self-adhering properties but also exhibit an extended pot life. The compositions can be prepared by mixing the polysiloxane and epoxy silane at room temperature and thereafter adding the mixture to the other ingredients. The remaining ingredients can be in the form of a two package product in which the polysiloxane-epoxy mixture is added to one package before the packages are mixed to form a curable product.

39 Claims, No Drawings

SELF-ADHERING SILICONE COMPOSITIONS AND PREPARATIONS THEREOF

BACKGROUND OF THE INVENTION

1. Field of the Invention

This invention relates to silicone elastomer compositions which cure on substrates to self-adhering elastomers and to methods of preparation.

2. Description of the Prior Art

Adhesion of silicone elastomers to substrates has been a problem which has taken many forms. Priming a substrate prior to applying an uncured silicone elastomer composition is one solution. The priming methods are adequate for the purpose of achieving a strong bond, but they suffer from the inconvenience of being at least two step processes. Another approach to the adhesion problem is the use of one or more additives in compositions to impart the adhesion property between a cured elastomer and a substrate. Additives are usually specific for each composition, application and condition under which they are used. Most additives have shortcomings, such as interfere with cure or vulcanization of the composition, cause one or more of the cured properties of the product to decrease, are limited to the substrates to which the cured composition will bond, reduce the shelf stability of the composition and increase the cost of the composition significantly.

The present invention is of the additive type in which the additive is a combination of an epoxy silane and a hydroxylated polysiloxane containing vinyl. It is known in the art to add epoxide compounds including silicon-containing epoxide compounds to silicone rubber to improve its tear strength, as described by Nitzsche et al. in U.S. Pat. No. 3,131,161. It is also known that certain organosilicon compounds which contain, in the same molecule, an alkenyl group and a group of the formula

where Q is an epoxy-containing monovalent hydrocarbon radical and X is a lower alkyl group, can be added to silicone compositions which cure through the reaction of alkenyl groups and silicon-bonded hydrogen atoms to improve the adhesion of the cured composition to substrates.

SUMMARY OF THE INVENTION

It has now been discovered that certain hydroxylated, vinyl-containing polysiloxane and epoxy-containing silanes can be used to provide silicone compositions which when cured in contact with substrates exhibit adhesion properties. Compositions obtained by mixing vinyl-containing polyorganosiloxane, organosilicon compound having silicon-bonded hydrogen atoms, a platinum catalyst, a hydroxyl-containing polysiloxane having at least one silicon-bonded hydroxyl radical and at least one silicon-bonded vinyl radical and a silane having an epoxy organo group and an alkoxy group, show adhesion to substrates when cured in contact with the substrates. These compositions can be, for example, elastomer-forming compositions and compositions which produce gels. An adhesion additive can be prepared by mixing the hydroxyl-containing polysiloxane and the epoxy silane under essentially anhydrous conditions at a temperature below 50° C. The resulting adhesion additive can then be mixed with vinyl-containing polyorganosiloxane and organosilicon compound having silicon-bonded hydrogen atoms to provide compositions. The resulting compositions have extended pot life and when applied to substrates and heat cured show improved adhesion properties.

DESCRIPTION OF THE INVENTION

This invention relates to a composition comprising a product obtained by mixing (A) vinyl-containing polyorganosiloxane having an average of about two silicon-bonded vinyl radicals per molecule, an average ratio of organo radicals per silicon atom within a range greater than 2 up to and including 2.03, and each organo radical of the polyorganosiloxane being a monovalent radical selected from the group consisting of hydrocarbon radicals and fluorinated alkyl radicals both having less than 7 carbon atoms per radical, (B) an organosilicon compound having an average of at least 3 silicon-bonded hydrogen atoms per organosilicon compound molecule and valences of any silicon atom in the organosilicon compound not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organosilicon compound having no more than one silicon-bonded hydrogen atom on any one silicon atom, (C) a platinum catalyst, (D) polysiloxane having an average of at least one silicon-bonded hydroxyl radical per molecule and an average of at least one silicon-bonded vinyl radical per molecule, the polysiloxane having siloxane units bonded through silicon-oxygen-silicon bonds and valences of each silicon atom in the polysiloxane are satisfied by at least one of monovalent alkyl radical having less than 7 carbon atoms per radical, phenyl radical, vinyl radical and hydroxyl radical, and the remaining valences of silicon being satisfied by divalent oxygen atoms, the polysiloxane having an average of less than 15 silicon atoms per molecule, and (E) a silane having at least one epoxy-containing organo group, at least one silicon-bonded alkoxy group having less than 5 carbon atoms per group, and any remaining valences on the silane not satisfied by an epoxy-containing organo group or an alkoxy group is satisfied by a monovalent hydrocarbon radical or a fluorinated alkyl radical both having less than 7 carbon atoms per radical, (A) and (B) being present in amounts sufficient to provide a mol ratio of silicon-bonded hydrogen atoms in (B) to silicon-bonded vinyl radical in (A) of 0.5 to 10, combined weight of (D) and (E) being present in amounts of 0.1 to 5 parts by weight per 100 parts by weight of the composition exclusive of the weight of (D) and (E), and (D) and (E) being present in a weight ratio of 0.25 to 1.8 parts by weight (E) per one part by weight (D).

The compositions of this invention can best be made by first preparing an adhesion additive by mixing (D) and (E) under essentially anhydrous conditions at a temperature lower than 50° C., preferably at room temperature. Because the silane (E) is moisture sensitive, the procedures used in mixing (D) and (E) should be kept free of moisture. By the phrase "under essentially anhydrous conditions" it is to be understood that the manipulations required to mix (D) and (E) do not permit the ingredients to be exposed to moisture, such as atmospheric moisture for sufficient time to absorb any significant moisture, preferably no exposure to moisture is permitted. After the adhesion additive is made, it can be used immediately or it can be stored under essentially anhydrous conditions until it is ready to be used. The adhesion additive is prepared by mixing (D) and (E) in amounts such that the resulting weight ratio falls within a range of 0.25 to 1.8 parts by weight (E) per one part by weight (D). The best adhesion results have been obtained with a weight ratio of 0.4 to 1.5 parts by weight (E) per one part by weight (D).

The adhesion additive in an amount of 0.1 to 5 parts by weight is combined with 100 parts by weight of a silicone composition comprising (A), (B) and (C). When (A), (B) and (C) are mixed a reaction begins, even at room temperature and cure will take place within a relatively short time, such as a few minutes to a few hours depending upon the type of ingredients and the amount of ingredients, unless some means is used to inhibit the curing reaction. In the present invention, compositions comprising (A), (B) and (C) when mixed with the adhesion additive have extended pot life of several days, often in excess of a week. Because the compositions have this extended pot life, the compositions require heating above 70° C. to provide a cure within an economical time for commercial applications. The compositions of this invention cure in shorter time periods, the higher the temperature, such as from several hours at 100° C. to less than 1 hour at 150° C. or above.

As stated above, the compositions of this invention can be prepared by combining (A), (B), (C) and the adhesion additive, but the resulting product is not suitable for storing for extended periods of time, unless additional inhibitor for the curing reaction is present. Many inhibitors are known, such as the acetylenic inhibitors described in U.S. Pat. No. 3,445,420 which is hereby incorporated by reference to show the acetylenic inhibitors.

It is not necessary to use inhibitors for the compositions of this invention unless one wishes to store the complete composition in one package. Another approach is to store the components of the composition in two or more packages, preferably two, and mix the contents of the two packages when one wishes to use the product. This approach is preferred because one avoids an additional ingredient, the inhibitor, and still has a sufficiently long working time that commercial production lines could conveniently use. In using two packages, one can mix (A), (C) and the adhesion additive making Composition No. 1 for one package and use (B) for Composition No. 2 in a second package. A preferred method is to combine some of (A), all of (C) and the adhesion additive to form Composition No. 1 for one package and combine the remainder of (A) and all of (B) to form Composition No. 2 for a second package. Then the compositions of this invention can be made by mixing Composition No. 1 and Composition No. 2 of either of the above combinations when one is ready to use it. One convenient method for making the composition in two packages is to make Composition No. 1 and Composition No. 2 so that they can be combined in equal weight ratios.

Mixing of the ingredients can be carried out by the use of conventional mixing equipment, preferably the equipment is designed for moisture sensitive materials. For the lower viscosity materials, mixing can be done by using low shear mixing apparatus, but for high viscosity materials, such as gums, high shear mixing equipment, such as rubber mills may be required. Organic solvents can be used to aid in the mixing process. When solvents are used, they should be solvents which do not interfere with the ingredients.

The vinyl-containing polyorganosiloxane, (A), has an average of about two silicon-bonded vinyl radicals per molecule. The number of vinyl radicals can vary from two per molecule, such as (A) is a blend of two or more polyorganosiloxanes in which some molecules may have more vinyl radicals than two per molecule and some may have less than two vinyl radicals per molecule where the average would be about two vinyl radicals per molecule. Although it is not required that the silicon-bonded vinyl radicals be located in the alpha, omega positions of the polyorganosiloxane, it is preferred that at least some vinyl radicals be located in these positions, and preferably the vinyl radicals are located at the polymer ends because such polyorganosiloxanes are more economical to prepare and provide satisfactory products. However, because of the polymeric nature of (A), its preparation results in products which have some variations in structure and thus some vinyls may not be in the alpha, omega positions even if the intent is to have them in these positions. Thus, if small amounts of monoorganosiloxane units are present, the resulting polyorganosiloxane may have some vinyl radicals located at branch sites.

The polyorganosiloxanes of (A) are essentially linear polymers which can have some branching, however, the polymers have an average ratio of organo radicals per silicon atom of from greater than 2 up to an including 2.03. The polyorganosiloxanes, therefore, have silicon-oxygen-silicon backbones with an average of greater than two organo groups per silicon atom. Preferably, (A) is made up of diorganosiloxane units with triorganosiloxane units for end groups, but small amounts of monoorganosiloxane units and $SiO_2$ units may also be present. The organo radicals having less than 7 carbon atoms per radical are each selected from monovalent hydrocarbon radicals such as methyl, ethyl, vinyl, propyl, hexyl and phenyl and monovalent fluorinated alkyl radicals, such as the perfluoroalkylethyl radicals including such species as 3,3,3-trifluoropropyl, β-(perfluoroethyl)ethyl and β-(perfluoropropyl)ethyl. Examples of (A) are dimethylvinylsiloxy endblocked polydimethylsiloxane, methylphenylvinylsiloxy enblocked polydimethylsiloxane, dimethylvinylsiloxy endblocked polymethyl-(3,3,3-trifluoropropyl)siloxane, dimethylvinylsiloxy endblocked polydiorganosiloxane copolymer of dimethylsiloxane units and methylphenylsiloxane units, and methylphenylvinylsiloxy enblocked polydiorganosiloxane copolymer of dimethylsiloxane units and diphenylsiloxane units. The polyorganosiloxane can have siloxane units such as dimethylsiloxane units, methylphenylsiloxane units, diphenylsiloxane units, methyl-(3,3,3-trifluoropropyl)siloxane units, methylethylsiloxane units, methylvinylsiloxane units, monomethylsiloxane units, monophenylsiloxane units, dimethylvinylsiloxane units, trimethylsiloxane units, methylphenylvinylsiloxane units and $SiO_2$ units. Polyorganosiloxanes of (A) can be single polymers or mixtures of polymers. These polymers should have at least 50 percent of the organic radicals as methyl radicals. The polyorganosiloxanes of (A) are well known in the art. A preferred (A) is a polydimethylsiloxane endblocked with dimethylvinylsiloxy units or methylphenylvinylsiloxy units where the ratio of the organo radicals per silicon atom is from 2.0015 to 2.03.

Organosilicon compound, (B), is a silicon compound containing at least 3 silicon-bonded hydrogen atoms per molecule. The silicon-bonded hydrogen atoms should each be on different silicon atoms. However, certain preparations may result in some small amount of silicon atoms with two silicon-bonded hydrogen atoms per silicon atom. These materials are not excluded from use in the present invention inasmuch as their removal from the other species could be prohibitively expensive and no detrimental effects are known from the use of such mixtures. For practical purposes, the organosilicon compounds are those which are designed to have one silicon-bonded hydrogen atom per silicon atom.

The organosilicon compound, (B), can be any siloxane having an average of at least three silicon-bonded hydrogen atoms per molecule and an average of no more than one silicon-bonded hydrogen atom per silicon atom. The remaining valences of the silicon atoms are satisfied by divalent oxygen atoms or by monovalent radicals of alkyl having one to six carbon atoms per radical, such as methyl, ethyl, propyl, isopropyl, butyl, tertiary butyl, pentyl, hexyl, cyclohexyl, or phenyl or 3,3,3-trifluoropropyl. The organohydrogensiloxanes can be homopolymers, copolymers and mixtures thereof which contain siloxane units of the following types:

$RSiO_{1.5}$, $R_2SiO$, $R_3SiO_{0.5}$,
$RHSiO$, $HSiO_{1.5}$, $R_2HSiO_{0.5}$,
$H_2SiO$, $RH_2SiO_{0.5}$ and $SiO_2$ where R is the monovalent radical defined above. Some specific examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane and copolymers of dimethylhydrogensiloxane, dimethylsiloxane and methylhydrogensiloxane. Preferably, the organohydrogensiloxanes have an average of at least five silicon-bonded hydrogen atoms per molecule. It is also preferred that (B) have less than 50 silicon atoms per molecule. Some additional species of organosilicon compounds, (B), can be found in U.S. Pat. No. 3,697,473 which is hereby incorporated to show species within the scope of (B) but is not intended to limit the scope of (B). U.S. Pat. No. 3,697,473 is also included by reference to show that in addition to species of (B) having at least 3 silicon-bonded hydrogen atoms, species which have 2 silicon-bonded hydrogen atoms can be combined with (B) for the attainment of specific properties.

Ingredients (A) and (B) are present in the compositions of this invention in amounts sufficient to provide a mol ratio of silicon-bonded hydrogen atoms to silicon-bonded vinyl radicals of 0.5 to 10. For the preparation of elastomeric compositions, the mol ratio of silicon-bonded hydrogen atoms in (B) to the silicon-bonded vinyl radicals in (A) is from 1 to 10 and for the preparation of gel-forming compositions the mol ratio of silicon-bonded hydrogen atoms in (B) to the silicon-bonded vinyl radicals in (A) is from 0.5 to 0.9.

The platinum catalyst, (C), can be any of the platinum catalysts known to catalyze the addition of silicon-bonded hydrogen atoms to silicon-bonded vinyl radicals. Platinum catalysts can be any of the known forms ranging from platinum as such, or as deposited on carriers such as silica gel or powdered charcoals to platinic chloride, salts of platinum, chloroplatinic acid and various complexes. Many of these platinum catalysts are described in U.S. Pat. No. 3,697,473 which is hereby incorporated to show platinum catalysts. One preferred class of platinum catalysts is described in U.S. Pat. No. 3,419,593 which is hereby incorporated by reference to show the preparation of this class of platinum catalysts and to show additional catalyst descriptions. Of the class of platinum catalysts described in U.S. Pat. No. 3,419,593, the most preferred is a reaction product of chloroplatinic acid and a vinylsiloxane having at least two dimethylvinylsiloxy units per molecule and any additional siloxane units being dimethylsiloxane. The platinum catalyst, (C), can be used in any catalytic quantity, such as in an amount sufficient to provide at least 0.1 part by weight platinum per one million parts by weight of (A), preferably at least one part by weight platinum per one million parts by weight (A) is used.

The polysiloxane, (D), is a siloxane having an average of less than 15 silicon atoms per molecule and containing one each per molecule of a silicon-bonded hydroxyl radical and a silicon-bonded vinyl radical. The valences of each silicon atom in (D) are satisfied by at least one of a monovalent alkyl radical having less than 7 carbon atoms per radical, phenyl radical, vinyl radical and hydroxyl radical with the remaining valences being satisfied by divalent oxygen atoms. (D) can have siloxane units, such as, $R'SiO_{1.5}$, $R'_2SiO$, $R'_3SiO_{0.5}$,
$CH_2=CHSiO_{1.5}$, $C_6H_5SiO_{1.5}$, $HOSiO_{1.5}$,
$R'(CH_2=CH)SiO$, $R'(HO)SiO_{1.5}$, $R'(C_6H_5)SiO$,
$(C_6H_5)_2SiO$, $(C_6H_5)(CH_2=CH)SiO$,
$(C_6H_5)(HO)SiO$, $(CH_2=CH)(HO)SiO$,
$(HO)R'_2SiO_{0.5}$, $(CH_2=CH)R'_2SiO_{0.5}$,
$(HO)(CH_2=CH)R'SiO_{0.5}$ and $(HO)(C_6H_5)R'SiO_{0.5}$ where R' is a monovalent alkyl radical of less than 7 carbon atoms per radical, such as methyl, ethyl, propyl, hexyl and cyclohexyl. Preferably, (D) is a polysiloxane having hydroxyl siloxane units as end groups and the other siloxane units as diorganosiloxane units, where the preferred diorganosiloxane units are methylvinylsiloxane units and dimethylsiloxane units. (D) can be a mixture of one or more siloxane species. Some preferred species include hydroxyl endblocked polymethylvinylsiloxanes and hydroxyl endblocked polydiorganosiloxane copolymers of dimethylsiloxane units and methylvinylsiloxane units. Preferably, (D) has from 3 to 15 siloxane units.

The silane (E) is a molecule containing one silicon atom per molecule which has bonded thereto at least one epoxy-containing organo group, at least one silicon-bonded alkoxy group, and any remaining valences are monovalent hydrocarbon radicals or monovalent fluorinated alkyl radicals. The alkoxy groups on (E) have less than 5 carbon atoms per group and are illustrated by methoxy, ethoxy, propoxy and butoxy. Both the monovalent hydrocarbon radicals and the fluorinated alkyl radicals have less than 7 carbon atoms per radical and are illustrated above in the description of (A). For the purpose of this invention "epoxy" refers to the structural group

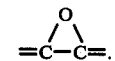

Many silanes of this type are known and are described in U.S. Pat. No. 3,455,877 which is hereby incorporated by reference to show the alkoxylated epoxy silanes and their preparation.

The silanes of (E) are preferably mono(epoxyorgano)trialkoxysilanes in which the epoxyorgano group is a radical of the formulae

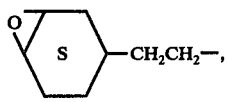

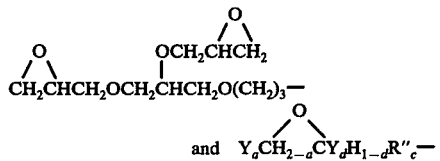

in which each Y is an alkyl radical of 1 or 2 carbon atoms, $a$ is 0, 1 or 2, $c$ and $d$ are each 0 or 1 and R" is a divalent hydrocarbon radical of no more than 12 carbon atoms and is either a saturated aliphatic hydrocarbon radical or an arylene radical, or divalent radicals of the formula

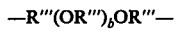

in which any two oxygen atoms are separated by at least two carbon atoms, R''' is a divalent saturated aliphatic hydrocarbon radical of 2 to 6 carbon atoms per radical and $b$ is 0 to 8. The preferred (E) is a silane of the formula

The weight ratio of (E) to (D) is within a range of 0.25 to 1.8 parts by weight of (E) per one part by weight of (D) to make the compositions of this invention. This weight ratio of (E) to (D) provides improved adhesion of the compositions when heat cured on substrates and used in amounts such that the combined weight of (D) and (E) is 0.1 to 5 parts by weight per 100 parts by weight of the composition exclusive of the weight of (D) and (E). The combined weight of (D) and (E) in the composition is preferably from 0.25 to 4 parts by weight and the preferred weight ratio of (E) to (D) is from 0.4 to 1.5 parts by weight (E) per one part by weight (D).

The compositions of this invention can also contain fillers, both extending fillers and reinforcing fillers. Extending fillers include such materials as quartz, calcium carbonate, potassium titanate, aluminum silicate, alumina, zinc oxide, titanium dioxide and ferric oxide. Reinforcing fillers include such materials as carbon blacks and silicas such as fume silica, silica aerogels, precipitated silicas and the like. The fillers, particularly the reinforcing silicas can be treated with organosilicon materials such as chlorosilanes, silazanes, alkoxysilanes and cyclic siloxanes to produce hydrophobic surfaces.

The compositions can also contain pigments, colorants, flame retardant additives, and plasticizers.

The composition of this invention can also contain a benzene soluble resin copolymer consisting essentially of triorganosiloxy units and SiO$_2$ units in which the mol ratio of triorganosiloxy units to SiO$_2$ units is 0.6 to 1. The triorganosiloxy units are present as a combination of trimethylsiloxy units and dimethylvinylsiloxy units such that the dimethylvinylsiloxy units contribute sufficient vinyl to the resin copolymer to provide a vinyl content of from 0.5 to 3.5 weight percent vinyl. This type of vinyl-containing resin copolymer is described in U.S. Pat. No. 3,284,406 which is hereby incorporated by reference to show vinyl-containing benzene soluble resin copolymers. Additionally, these benzene soluble copolymers can be prepared by the method described in U.S. Pat. No. 2,676,182 which is hereby incorporated by reference to show a method of preparation.

A preferred embodiment is a composition which cures to an elastomer. These compositions can be used as embedding materials, encapsulants for electrical components, as an electrical insulation, exhibit a flame retardant property, as coatings, and as potting materials. The compositions of this embodiment comprise a product obtained by mixing (A) a polydimethylsiloxane endblocked with dimethylvinylsiloxy units or methylphenylvinylsiloxy units in which the average ratio of organo radicals per silicon atom is in a range of 2.0025 to 2.02, (B) is a polymer having at least 3 silicon-bonded hydrogen atoms per molecule consisting of trimethylsiloxy units, dimethylsiloxane units and methylhydrogensiloxane units where the average number of siloxane units per molecule is less than 50, (C) is a reaction product of chloroplatinic acid and a vinylsiloxane having at least two dimethylvinylsiloxy units per molecule and any additional siloxane units being dimethylsiloxane, (D) is a polysiloxane having an average of about two silicon-bonded hydroxyl radicals per molecule, 3 to 15 siloxane units selected from dimethylsiloxane unit and methylvinylsiloxane unit, and an average of at least one silicon-bonded vinyl radical per molecule, (E) is a silane of the formula

and an extending filler (F) is present. In this composition (A) is present in an amount of 100 parts by weight, (B) is present in an amount of 0.5 to 10 parts by weight, (C) is present in an amount sufficient to provide from 5 to 50 parts by weight platinum per one million parts by weight of (A), the combined weight of (D) and (E) is present in an amount of 0.25 to 2 parts by weight per 100 parts by weight of the composition exclusive of the weight of (D) and (E) where the weight ratio of (E) to (D) is from 0.4 to 1.5, (F) is present in an amount of 20 to 150 parts by weight and the ratio of silicon-bonded hydrogen atoms in (B) to the silicon-bonded vinyl radicals in (A) is from 1.2 to 4. The most preferred compositions of this embodiment are those which have lower viscosities where the average ratio of organo radicals per silicon atom in (A) is in a range of 2.0065 to 2.02, the extending filler is finely divided quartz, and pigment is present particularly carbon black which improves the flame retardant property of the cured products. These compositions can contain polymethylvinylcyclosiloxane in amounts of 0.01 to 0.5 parts by weight. These compositions when heat cured show improved adhesion to substrates such as glass, aluminum, copper, stainless steel and many organic plastics such as polyesters.

Another preferred embodiment is a composition which cures to a gel product. These products are soft materials which can be used to pot and encapsulate electrical components which are confined by a container. These compositions are as set forth in the above preferred embodiment except they do not contain an extending filler, (B) is present in an amount of 0.25 to 2 parts by weight, (C) is present in an amount sufficient to provide from 1 to 50 parts by weight platinum per one million parts by weight of (D), the combined weight of (D) and (E) is present in an amount of 0.1 to 1 part by weight per 100 parts by weight of the composition exclusive of the weight of (D) and (E) and the ratio of silicon-bonded hydrogen atoms in (B) to the silicon-bonded vinyl radicals in (A) is from 0.5 to 0.9.

Still another preferred embodiment is a composition which heat cures to an elastomer of high strength. These compositions can be used in the same type of applications as described above for the first preferred embodiment, except the cured elastomers are stronger and tougher products. These compositions are as set forth in the above first preferred embodiment except in place of the extending filler, a reinforcing silica filler, (F), which has its surface treated with trimethylsiloxy units is present, a vinyl-containing benzene soluble resin copolymer, (G), as described herein is present, the combined weight of (D) and (E) is present in an amount of 0.25 to 3 parts by weight per 100 parts by weight of the composition exclusive of the weight of (D) and (E) where the weight ratio of (E) to (D) is from 0.4 to 1.8, the reinforcing silica, (F), is present in an amount of 5 to 50 parts by weight, (G) is present in an amount of 5 to 25 parts by weight and the ratio of silicon-bonded hydrogen atoms in (B) to the silicon-bonded vinyl radicals in (A) is from 2 to 8. These compositions can contain pigment and polymethylvinylcyclosiloxane in an amount of 0.01 to 0.5 part by weight. Compositions in which (A) is present as a blend of a high viscosity polymer and a low viscosity polymer are preferred. Such blends are those in which one polydimethylsiloxane has an average ratio of organo radicals per silicon atom of 2.004 to 2.02 and a second polydimethylsiloxane has an average ratio of organo radicals per silicon atom of 2.0025 to 2.005.

The following examples are presented for illustrative purposes and should not be construed as limiting the scope of the invention which is delineated in the claims. All parts in the following examples are parts by weight unless otherwise specifically stated.

EXAMPLE 1

Under essentially anhydrous conditions, 100 parts of hydroxyl endblocked polymethylvinylsiloxane with silicon-bonded hydroxyl radical in an amount of 4 to 5.5 weight percent and an average of 7 to 10 methylvinylsiloxane units per molecule and 65.3 parts of silane of the formula

were mixed at room temperature to provide an adhesion additive No. 1.

Compositions were prepared in two parts. Composition No. 1 was prepared by mixing under a dry nitrogen atmosphere, 100 parts of methylphenylvinylsiloxy endblocked polydimethylsiloxane (Polymer A) having a viscosity at 25° C. in the range of 0.3 to 0.5 Pa·s (pascal·seconds) and an average ratio of organic radicals per silicon atom in the range of 2.012 to 2.016, 88.95 parts of 5 micron quartz filler, 0.54 part of a chloroplatinic acid complex of divinyltetramethyldisiloxane diluted with Polymer A to provide 0.7 weight percent platinum, 1.85 parts of zinc oxide and 0.9 part of carbon black. Three additional compositions were prepared by adding to 100 parts of Composition No. 1 the amounts of adhesion additive No. 1 as described below:

Composition No. 1-A: 1 part

Composition No. 1-B: 2 parts
Composition No. 1-C: 3 parts

Composition No. 2 was prepared by mixing under a nitrogen atmosphere, 100 parts of Polymer A, 100 parts of 5 micron quartz filler, 11.17 parts of a trimethylsiloxy endblocked polyorganosiloxane (Polymer B) having siloxane units of 37.5 mol percent dimethylsiloxane units and 62.5 mol percent methylhydrogensiloxane units where the mol percent is exclusive of the trimethylsiloxy units and a silicon-bonded hydrogen atom content in the range of about 0.7 to 0.8 weight percent, and 0.25 part of polymethylvinylcyclosiloxane having from 3 to 7 siloxane units per molecule.

Elastomeric compositions were prepared by mixing each of Composition No. 1, Composition No. 1-A, Composition No. 1-B and Composition No. 1-C with Composition No. 2 in equal weight amounts. The resulting compositions were coated on aluminum test panels and cured by heating for 15 minutes at 150° C. These aluminum-elastomer assemblies were used to measure adhesion under shear. The test was done in accordance with ASTM-D 1002 test procedure with the results in pascals (Pa). The amount of cohesive failure was determined by observing the pulled adhesion panels. Other test samples were prepared and test samples were prepared and tested in accordance with ASTM-D 2240 procedure for durometer with the results on the Shore A scale and with ASTM-D 412 procedure for tensile strength and elongation at break with the results in Pa and percent respectively. The test values shown in Table I are averages of three test samples.

TABLE I

| Composition Prepared From | Adhesion, Pa | Percent Cohesive Failure | Durometer, Shore A | Tensile Strength, Pa | Elongation, Percent |
|---|---|---|---|---|---|
| No. 1 | 483 | 0 | 49 | 2882 | 117 |
| No. 1-A | 1931 | 25 | 49 | 2255 | 87 |
| No. 1-B | 2379 | 25 | 56 | 2806 | 77 |
| No. 1-C | 1682 | 30 | 43 | 1675 | 73 |

EXAMPLE 2

Five adhesion additives were prepared by mixing under anhydrous conditions using the hydroxyl endblocked polymethylvinylsiloxane and silane as defined in Example 1. The weight ratios were as described in Table II.

TABLE II

| Adhesion Additive No. | Parts of Silane Per Part of Siloxane |
|---|---|
| 2 | 0.45 |
| 3 | 0.55 |
| 4 | 0.65 |
| 5 | 0.75 |
| 6 | 0.85 |

Compositions were prepared in two parts. Composition No. 1 was prepared by mixing under a dry nitrogen atmosphere, 69 parts of methylphenylvinylsiloxy endblocked polydimethylsiloxane (Polymer C) having a viscosity at 25° C. in the range of 1.8 to 2.4 Pa·s and an average ratio of organic radicals per silicon atom in the range of 2.006 to 2.007, 31 parts of methylphenylvinylsiloxy endblocked polydimethylsiloxane (Polymer D) having a viscosity in the range of 7 to 12 Pa·s and an average ratio of organic radicals per silicon atom in the range of 2.0036 to 2.0043, 37.5 parts of fume silica having its surface treated with trimethylsiloxy units, 5.12 parts of titanium dioxide, 12.43 parts of a benzene soluble resin copolymer of triorganosiloxy units and $SiO_2$ units in the mol ratio of about 0.7 moles of triorganosiloxy unit per mole of $SiO_2$ unit where the triorganosiloxy units are trimethylsiloxy units and dimethylvinylsiloxy units and the resin copolymer has from 1.4 to 2.2 weight percent silicon-bonded vinyl radical, and 0.27 part of the platinum complex defined in Example 1. Composition No. 2 was prepared by mixing under dry nitrogen, 100 parts of Polymer C, 53.85 parts of the resin copolymer defined above, 82.92 parts of Polymer B and 3 parts of polymethylvinylcyclosiloxane. Elastomeric compositions were prepared by mixing 10 parts of Composition No. 1 including adhesion additive which is added to Composition No. 1 in amounts of 1.5 parts additive per 100 parts of Composition No. 1, and one part of Composition No. 2. Adhesion test samples were prepared as described in Example 1 and cured for 1 hour at 150° C. Other test samples for physical properties were prepared and cured for 15 minutes at 150° C. The tests were done as described in Example 1 and the values shown in Table III are averages of three test samples.

TABLE III

| Adhesion Additive No. | Adhesion, Pa | Percent Cohesive Failure | Durometer, Shore A | Tensile Strength, Pa | Elongation, Percent |
|---|---|---|---|---|---|
| None | 476 | 0 | 40 | 5654 | 267 |
| 2 | 2013 | 10–15 | 38 | 4530 | 297 |
| 3 | 1889 | 10 | 38 | 4275 | 287 |
| 4 | 2496 | 5–10 | 39 | 4909 | 303 |
| 5 | 3103 | 10 | 40 | 4813 | 290 |
| 6 | 2654 | 5 | 40 | 4633 | 273 |

EXAMPLE 3

Adhesion additives were prepared by mixing under dry nitrogen one part of hydroxyl endblocked polydiorganosiloxane (Polymer E) consisting of dimethylsiloxane units and methylvinylsiloxane units such that the polydiorganosiloxane has from 10 to 12 weight percent silicon-bonded vinyl radical and 8 to 15 weight percent silicon-bonded hydroxyl radical and the silane as defined in Example 1. Adhesion additives were prepared by mixing one part of the polydiorganosiloxane with the parts of silane as described in Table IV.

TABLE IV

| Adhesion Additive No. | Parts of Silane Per Part of Polymer E |
|---|---|
| 7 | 1.0 |
| 8 | 1.15 |
| 9 | 1.3 |
| 10 | 1.45 |
| 11 | 1.6 |

Compositions were prepared by mixing 1.5 parts of each of the above adhesion additives with 100 parts of Composition No. 1 of Example 2, the resulting composition was then mixed with one part of Composition No. 2 of Example 2. The elastomeric compositions were used to prepare test samples, all of which were cured for 1 hour at 150° C. The tests were done as described in Example 1 and the values shown in Table V are averages of three test samples.

TABLE V

| Adhesion Additive No. | Adhesion, Pa | Percent Cohesive Failure | Durometer, Shore A | Tensile Strength, Pa | Elongation, Percent |
|---|---|---|---|---|---|
| 7 | 4461 | 100 | 43 | 5433 | 240 |
| 8 | 4640 | 84 | 44 | 4840 | 210 |
| 9 | 3964 | 94 | 43 | 6260 | 267 |
| 10 | 4709 | 95 | 43 | 6274 | 267 |
| 11 | 4413 | 99 | 43 | 5468 | 230 |

EXAMPLE 4

Compositions were prepared as described in Example 1 except in Composition No. 2, the polymethylvinylcyclosiloxane was left out. Various additives were used and are described in Table VI.

TABLE VI

| Additive No. | Additive Description |
|---|---|
| 1. | Adhesion Additive No. 1 |
| 2. | A mixture of one part of hydroxyl endblocked polydimethylsiloxane having 3.7 to 4.2 weight percent silicon-bonded hydroxyl radical and 0.7 part of the silane described in Example 1. |
| 3. | The hydroxyl endblocked polymethylvinylsiloxane defined in Example 1. |
| 4. | The silane defined in Example 1. |

Compositions were prepared by adding an amount of additive described in Table VII to 100 parts of Composition No. 1 of Example 1. Test samples were prepared and tested as described in Example 1 where the compositions were cured for 1 hour at 150° C. The values shown in Table VII are averages of three test samples.

TABLE VII

| Additive No. | Amount Additive, Parts | Adhesion Pa | Percent Cohesive Failure | Durometer Shore A | Tensile Strength, Pa | Elongation Percent |
|---|---|---|---|---|---|---|
| None | None | 345 | — | 59 | 3634 | 77 |
| 1. | 1.0 | 1944 | — | 53 | 2151 | 63 |
| 1. | 1.0 | 2013 | — | 51 | 2379 | 77 |
| 1. | 1.0 | 1531 | — | 55 | 2324 | 63 |
| 1. | 1.5 | 1413 | — | 39 | 1262 | 67 |
| 1. | 1.5 | 1193 | — | 38 | 1441 | 73 |
| 1. | 1.5 | 1048 | — | 44 | 1841 | 70 |
| 2.* | 3.0 | 144 | 0 | 59 | 3992 | 87 |
| 3.* | 3.0 | 345 | 0 | 14 | 269 | 57 |
| 4.* | 3.0 | 820 | 0 | 62 | 3282 | 93 |

*Presented for comparative purposes.

EXAMPLE 5

A composition was prepared in two parts. Composition No. 1 was prepared by mixing under a dry nitrogen atmosphere, 100 parts of Polymer A, 42.16 parts of 5 micron quartz filler, 0.61 part of the platinum complex defined in Example 1, 0.91 part of carbon black, 1.83 parts of zinc oxide and 0.29 part of 3-methyl-1-butyn-3-ol. Composition No. 2 was prepared by mixing under a dry nitrogen atmosphere, 100 parts of Polymer A, 53.49 parts of 5 micron quartz filler and 14.46 parts of Polymer B. To 100 parts of Composition No. 1, 3 parts of adhesion additive No. 1 was added and mixed. The resulting composition containing the adhesion additive was mixed with Composition No. 2 in equal weight amounts. The resulting composition was used to prepare test samples as described in Example 1. The samples were cured by heating at 150° C. for 1 hour. The tests were done as described in Example 1. The following values are averages of three samples each. The adhesion was 979 Pa with 98 percent cohesive failure, the durometer was 44 on the Shore A scale, the tensile strength was 1827 Pa and the elongation was 93 percent.

EXAMPLE 6

A gel composition was prepared in two parts. Composition No. 1 was prepared by mixing under essentially anhydrous conditions, 100 parts of Polymer A, 0.24 part of the silane defined in Example 1, 0.28 part of the hydroxyl endblocked polymethylvinylsiloxane defined in Example 1 and 0.41 part of the platinum complex as defined in Example 1. Composition No. 2 was prepared by mixing under essentially anhydrous conditions, 100 parts of Polymer A and 3 parts of Polymer B. The gel composition was prepared by mixing Composition No. 1 and Composition No. 2 in equal weight amounts and was heated above 70° C. to gel the product.

That which is claimed is:

1. A composition comprising a product obtained by mixing
   (A) vinyl-containing polyorganosiloxane having an average of about two silicon-bonded vinyl radicals per molecule, an average ratio of organo radicals per silicon atom within a range greater than 2 up to and including 2.03, and each organo radical of the polyorganosiloxane being a monovalent radical selected from the group consisting of hydrocarbon radicals and fluorinated alkyl radicals both having less than 7 carbon atoms per radical,
   (B) an organosilicon compound having an average of at least 3 silicon-bonded hydrogen atoms per organosilicon compound molecule and valences of any silicon atom in the organosilicon compound not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organosilicon compound having no more than one silicon-bonded hydrogen atom on any one silicon atom,
   (C) a platinum catalyst,
   (D) polysiloxane having an average of at least one silicon-bonded hydroxyl radical per molecule and an average of at least one silicon-bonded vinyl radical per molecule, the polysiloxane having siloxane units bonded through silicon-oxygen-silicon bonds and valences of each silicon atom in the polysiloxane are satisfied by at least one of monovalent alkyl radical having less than 7 carbon atoms per radical, phenyl radical, vinyl radical and hydroxyl radical and the remaining valences of silicon being satisfied by divalent oxygen atoms, the polysiloxane having an average of less than 15 silicon atoms per molecule, and
   (E) a silane having at least one epoxy-containing organo group, at least one silicon-bonded alkoxy group having less than 5 carbon atoms per group, and any remaining valences on the silane not satisfied by an epoxy-containing organo group or an alkoxy group is satisfied by a monovalent hydrocarbon radical or a fluorinated alkyl radical both having less than 7 carbon atoms per radical,
   (A) and (B) being present in amounts sufficient to provide a mol ratio of silicon-bonded hydrogen atoms in (B) to silicon-bonded vinyl radical in (A) of 0.5 to 10, combined weight of (D) and (E) being present in amounts of 0.1 to 5 parts by weight per 100 parts by weight of the composition exclusive of the weight of (D) and (E), and (D) and (E) being present in a weight ratio of 0.25 to 1.8 parts by weight (E) per one part by weight (D).

2. The composition according to claim 1 in which (A) is a polydimethylsiloxane endblocked with triorganosiloxy units selected from the group consisting of dimethylvinylsiloxy units and methylphenylvinylsiloxy units having an average ratio of organo radicals per silicon atom of 2.0015 to 2.03, (B) is a polymer of units selected from the group consisting of trimethylsiloxy unit, dimethylsiloxane unit, methylhydrogensiloxane unit, and dimethylhydrogensiloxy unit, (D) is a polysiloxane of units selected from the group of dimethylsiloxane unit and methylvinylsiloxane unit, having an average of about two silicon-bonded hydroxy radicals per polysiloxane molecule, and (E) is a mono(epoxyorgano)trialkoxysilane.

3. The composition according to claim 2 in which the combined weight of (D) and (E) is from 0.25 to 4 parts by weight per 100 parts by weight of the composition exclusive of the weight of (D) and (E).

4. The composition according to claim 3 in which (D) and (E) are present in a weight ratio of 0.4 to 1.5 parts by weight (E) per one part by weight (D).

5. The composition according to claim 2 in which the average ratio of organo radicals per silicon atom in (A) is in a range of 2.0025 to 2.02, (B) is a polymer consisting of trimethylsiloxy units, dimethylsiloxane units and methylhydrogensiloxane units where the average number of siloxane units per molecule is less than 50, (C) is a reaction product of chloroplatinic acid and a vinylsiloxane having at least two dimethylvinylsiloxy units per molecule and any additional siloxane units being dimethylsiloxane, (D) is a polysiloxane having an average of 3 to 15 siloxane units per molecule of polysiloxane, (E) is a silane of the formula

and (F) an extending filler is present, (A) is present in an amount of 100 parts by weight, (B) is present in an amount of 0.5 to 10 parts by weight, (C) is present in an amount sufficient to provide from 5 to 50 parts by weight platinum per one million parts by weight of (A), the combined weight of (D) and (E) is present in an amount of 0.25 to 2 parts by weight per 100 parts by weight of the composition exclusive of the weight of (D) and (E), where the weight ratio of (E) to (D) is from 0.4 to 1.5, (F) is present in an amount of 20 to 150 parts by weight and the ratio of silicon-bonded hydrogen atoms in (B) to the silicon-bonded vinyl radicals in (A) is from 1.2 to 4.

6. The composition according to claim 5 in which the average ratio of organo radicals per silicon atom in (A) is in a range of 2.0065 to 2.02.

7. The composition according to claim 6 in which the extending filler (F) is a finely divided quartz filler, pigment is present.

8. The composition according to claim 7 in which polymethylvinylcyclosiloxane is present in an amount of 0.01 to 0.5 part by weight.

9. The composition according to claim 2 in which the average ratio of organo radicals per silicon atom in (A) is in a range of 2.0025 to 2.02, (B) is a polymer consisting of trimethylsiloxy units, dimethylsiloxane units and methylhydrogensiloxane units where the average number of siloxane units per molecule is less than 50, (C) is a reaction product of chloroplatinic acid and a vinylsiloxane having at least two dimethylvinylsiloxy units per molecule and any additional siloxane units being dimethylsiloxane, (D) is a polysiloxane having an average of 3 to 15 siloxane units per molecule of polysiloxane, and (E) is a silane of the formula

(A) is present in an amount of 100 parts by weight, (B) is present in an amount of 0.25 to 2 parts by weight, (C) is present in an amount sufficient to provide from 1 to 50 parts by weight platinum per one million parts by weight (A), the combined weight of (D) and (E) is present in an amount of 0.1 to 1 part by weight per 100 parts by weight of the composition exclusive of the weight of (D) and (E), where the weight ratio of (E) to (D) is from 0.4 to 1.5 and the ratio of silicon-bonded hydrogen atoms in (B) to the silicon-bonded vinyl radicals in (A) is from 0.5 to 0.9.

10. The composition according to claim 9 in which the average ratio of organo radicals per silicon atom in (A) is in a range of 2.0065 to 2.02.

11. The composition according to claim 2 in which the average ratio of organo radicals per silicon atom in (A) is in a range of 2.0025 to 2.02, (B) is a polymer consisting of trimethylsiloxy units, dimethylsiloxane units and methylhydrogensiloxane units where the average number of siloxane units per molecule is less than 50, (C) is a reaction product of chloroplatinic acid and a vinylsiloxane having at least two dimethylvinylsiloxy units per molecule and any additional siloxane units being dimethylsiloxane, (D) is a polysiloxane having an average of 3 to 15 siloxane units per molecule of polysiloxane, (E) is a silane of the formula

(F) a reinforcing silica filler which has a surface treated with trimethylsiloxy units is present and (G) a benzene soluble resin copolymer consisting essentially of triorganosiloxy units and $SiO_2$ units in which the mol ratio of triorganosiloxy units to $SiO_2$ units is 0.6 to 1 and the triorganosiloxy units are present as a combination of trimethylsiloxy units and dimethylvinylsiloxy units such that the dimethylvinylsiloxy units contribute sufficient vinyl to the resin copolymer to provide a vinyl content of from 0.5 to 3.5 weight percent vinyl, (A) is present in an amount of 100 parts by weight, (B) is present in an amount of from 0.5 to 10 parts by weight, (C) is present in an amount sufficient to provide from 5 to 50 parts by weight platinum per one million parts by weight (A), the combined weight of (D) and (E) is present in an amount of 0.25 to 3 parts by weight per 100 parts by weight of the composition exclusive of the weight of (D) and (E), where the weight ratio of (E) to (D) is from 0.4 to 1.8, (F) is present in an amount of 5 to 50 parts by weight, (G) is present in an amount of 5 to 25 parts by weight, and the ratio of silicon-bonded hydrogen atoms in (B) to the silicon-bonded vinyl radicals in (A) is from 2 to 8.

12. The composition according to claim 11 in which there is a pigment present.

13. The composition according to claim 12 in which polymethylvinylcyclosiloxane is present in an amount of 0.01 to 0.5 part by weight.

14. The composition according to claim 11 in which (A) is a blend of two polydimethylsiloxanes in which one polydimethylsiloxane has an average ratio of organo radicals per silicon atom of 2.004 to 2.02 and the other polydimethylsiloxane has an average ratio of organo radicals per silicon atom of 2.0025 to 2.005.

15. The composition according to claim 12 in which (A) is a blend of two polydimethylsiloxanes in which one polydimethylsiloxane has an average ratio of organo radicals per silicon atom of 2.004 to 2.02 and the other polydimethylsiloxane has an average ratio of organo radicals per silicon atom of 2.0025 to 2.005.

16. A method for preparing an adhesion additive suitable for use in silicone elastomer compositions comprising mixing under essentially anhydrous conditions at a temperature lower than 50° C., (D) polysiloxane having an average of at least one silicon-bonded hydroxyl radical per molecule and an average of at least one silicon-bonded vinyl radical per molecule, the polysiloxane having siloxane units bonded through silicon-oxygen-silicon bonds and valences of each silicon atom in the polysiloxane are satisfied by at least one of monovalent alkyl radical having less than 7 carbon atoms per radical, phenyl radical, vinyl radical, and hydroxyl radical, and the remaining valences of silicon being satisfied by divalent oxygen atoms, the polysiloxane having an average of less than 15 silicon atoms per molecule, and (E) a silane having at least one epoxy-containing organo group, at least one silicon-bonded alkoxy group having less than 5 carbon atoms per group and any remaining valences on the silane not satisfied by an epoxy-containing organo group or an alkoxy group is satisfied by a monovalent hydrocarbon radical or a fluorinated alkyl radical both having less than 7 carbon atoms per radical, where (D) and (E) are present in a weight ratio of 0.25 to 1.8 parts by weight (E) per one part by weight (D), resulting in an adhesion additive.

17. The method in accordance with claim 16 in which (D) is a polysiloxane of units selected from the group of dimethylsiloxane unit and methylvinylsiloxane unit, having an average of about two silicon-bonded hydroxyl radicals per molecule, and (E) is a mono(epoxyorgano)trialkoxysilane.

18. The method in accordance with claim 17 in which (D) has an average of one methylvinylsiloxane unit per molecule.

19. The method in accordance with claim 17 in which all the siloxane units of (D) are methylvinylsiloxane units.

20. The method in accordance with claim 17 in which (E) is a silane of the formula

21. The method in accordance with claim 18 in which (E) is a silane of the formula

22. The method in accordance with claim 19 in which (E) is a silane of the formula

23. An adhesion additive as prepared by the method of claim 17.

24. An adhesion additive as prepared by the method of claim 18.

25. An adhesion additive as prepared by the method of claim 19.

26. An adhesion additive as prepared by the method of claim 20.

27. An adhesion additive as prepared by the method of claim 21.

28. An adhesion additive as prepared by the method of claim 22.

29. A method of preparing a silicone elastomer composition which adheres to a substrate when the silicone elastomer composition is cured in contact with the substrate, comprising mixing from 0.1 to 5 parts by weight of the adhesion additive of claim 23 with 100 parts by weight of a silicone elastomer composition comprising (A) vinyl-containing polyorganosiloxane having an average of about two silicon-bonded vinyl radicals per molecule, an average ratio of organo radicals per silicon atom within a range greater than 2 up to and including 2.03, and each organo radical of the polyorganosiloxane being a monovalent radical selected from the group consisting of hydrocarbon radicals and fluorinated alkyl radicals both having less than 7 carbon atoms per radical, (B) an organosilicon compound having an average of at least 3 silicon-bonded hydrogen atoms per organosilicon compound molecule and valences of any silicon atom in the organosilicon compound not satisfied by a hydrogen atom is satisfied by a divalent oxygen atom or an organo radical, wherein each organo radical is a monovalent radical selected from the group consisting of hydrocarbon radicals and fluorinated alkyl radicals both having less than 7 carbon atoms per molecule, the organosilicon compound having no more than one silicon-bonded hydrogen atom on any one silicon atom, and (C) a platinum catalyst, (A) and (B) being present in amounts sufficient to provide a mol ratio of silicon-bonded hydrogen atoms in (B) to silicon-bonded vinyl radical in (A) of 1 to 10.

30. The method in accordance with claim 29 in which a resulting composition of claim 27 is applied to a substrate and thereafter heated above 70° C. to cure the composition to an elastomer.

31. An assembly prepared by the method of claim 30 in which a cured elastomer is bonded to a substrate.

32. The method in accordance with claim 29 in which the adhesion additive is mixed with (A) and (C) forming Composition No. 1, (B) forms Composition No. 2 and thereafter Compositions No. 1 and No. 2 are mixed to provide a product curable to an elastomer.

33. The method in accordance with claim 29 in which the adhesion additive is mixed with some (A) and all of (C) forming Composition No. 1, the remainder of (A) and all of (B) are mixed forming Composition No. 2 and thereafter Compositions No. 1 and No. 2 are mixed to provide a product curable to an elastomer.

34. The method in accordance with claim 32 in which the product curable to an elastomer is applied to a substrate and thereafter heated above 70° C. to cure the product to an elastomer.

35. The method in accordance with claim 33 in which the product curable to an elastomer is applied to a substrate and therafter heated above 70° C. to cure the product to an elastomer.

36. An assembly prepared by the method of claim 34 in which a cured elastomer is bonded to a substrate.

37. An assembly prepared by the method of claim 35 in which a cured elastomer is bonded to a substrate.

38. The assembly of claim 37 in which the substrate is glass.

39. The assembly of claim 37 in which the substrate is aluminum.

* * * * *